(12) United States Patent
Miyata et al.

(10) Patent No.: US 7,555,446 B2
(45) Date of Patent: Jun. 30, 2009

(54) NEEDS-INFORMATION ARCHITECTING METHOD, NEEDS-INFORMATION ARCHITECTING DEVICE, AND NEEDS-INFORMATION ARCHITECTING PROGRAM AND RECORDING MEDIUM ON WHICH IT IS RECORDED

(75) Inventors: Ryosuke Miyata, Kawasaki (JP); Toshiyuki Fukuoka, Kawasaki (JP); Eiji Kitagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 592 days.

(21) Appl. No.: 10/284,086

(22) Filed: Oct. 31, 2002

(65) Prior Publication Data
US 2003/0105647 A1    Jun. 5, 2003

(30) Foreign Application Priority Data
Nov. 30, 2001    (JP)    ............................. 2001-366724

(51) Int. Cl.
*G06F 17/30*    (2006.01)
(52) U.S. Cl. .......................................... 705/27; 705/26
(58) Field of Classification Search .............. 705/26–27
See application file for complete search history.

(56) References Cited

U.S. PATENT DOCUMENTS

| | | | | |
|---|---|---|---|---|
| 5,768,142 A | * | 6/1998 | Jacobs | 700/231 |
| 6,002,854 A | * | 12/1999 | Lynch et al. | 703/1 |
| 6,064,982 A | * | 5/2000 | Puri | 705/27 |
| 6,826,745 B2 | * | 11/2004 | Coker et al. | 717/115 |
| 2004/0098288 A1 | * | 5/2004 | Minakuchi | 705/7 |

FOREIGN PATENT DOCUMENTS

| | | |
|---|---|---|
| JP | 7-182427 | 7/1995 |
| JP | 07-234877 | 9/1995 |
| JP | 2000083059 | 3/2000 |

OTHER PUBLICATIONS

Green, Paul E. et al.: "Individualized hybrid models for conjoint analysis," Management Science, Jun. 1996, v42i6pg850; Proquest #10093494, 22pgs.*
Shiomi Ohno, "WWW Retrieval Based on the Degree of Reference Importance", Jan. 27, 2000, Japan, pp. 1-8, No. 11, vol. 2000.
Office Action issued by the Japanese Patent Office on Jul. 10, 2007 for Japanese Patent Application 2001-366724, 2 pages.

* cited by examiner

*Primary Examiner*—Robert M. Pond
(74) *Attorney, Agent, or Firm*—Staas & Halsey LLP

(57) ABSTRACT

Products matching customer wishes are retrieved from among a large variety of merchandise. A topic net in which merchandise features from a customer's perspective are expressed is configured with needs information representing customer needs. Evaluation criteria for topic units are set in the topic net, and based on the needs information with which the topic net is configured, on the evaluation criteria, and on merchandise specifications, a combined suitability level indicating to what extent a product meets the customer's needs is calculated for each product. The product whose combined suitability level is highest may be surmised to be the product most befitting the customer's needs.

14 Claims, 17 Drawing Sheets

ID:       TP-3
Text:     "Don't you think it would be nice to be able to watch DVDs on the bullet train?"
Conditions: significance < 50 for "watch DVDs on the bullet train"
OR conviction < 50 for "watch DVDs on the bullet train"

ID:LK 101
Text:     "So by 'carrying around' you mean in a *bag*, right?"
Conditions: significance > 80 for "carry around"
AND conviction > 60 for "carry around"
AND significance > 80 for "carry around in a bag"

*Fig. 7*

Evaluation Criteria for TP-108
"put it in a bag"

| Suitability | Area |
|---|---|
| 100 | under A5 |
| 80 | around A5 |
| 50 | around B5 |
| 10 | over A4 |

Fig. 9A

Evaluation Criteria for TP-105
"light enough to take with you"

| Suitability | Weight |
|---|---|
| 100 | under 1.0 kg |
| 80 | 1.0kg~1.4kg |
| 50 | 1.4kg~1.8kg |
| 20 | 1.8kg~2.3kg |
| 0 | over 2.3 kg |

Evaluation Criteria for TP-105
"light enough to take with you"

Suitability = 100 × (2.3 − weight) / 1.3

Fig. 9B

Evaluation Criteria for
"does fine pointing"

| Suitability | Pointing |
|---|---|
| 80 | trackball |
| 60 | touchpad |

Fig. 9C

| Merchadise | Combined Suitability |
|---|---|
| Product D | 240 |
| Product A | 135 |
| Product B | 112 |
| Product E | 88 |
| Product C | 64 |
| ... | |

← Best-Suited Product

*Fig. 10*

NEEDS-INFORMATION ARCHITECTING METHOD, NEEDS-INFORMATION ARCHITECTING DEVICE, AND NEEDS-INFORMATION ARCHITECTING PROGRAM AND RECORDING MEDIUM ON WHICH IT IS RECORDED

BACKGROUND OF THE INVENTION

1. Technical Field

The present invention relates to technology for searching for merchandise suited to customers.

2. Description of the Related Art

Searching for merchandise meeting customer wishes from a merchandise DB (database) in which merchandise information pertaining to large-volume merchandise has been stored is a general practice. In the merchandise DB, specifications on the merchandise are stored in assigned correspondences with merchandise IDs. In order to seek out from this sort of merchandise-information DB merchandise that accords with customer wishes, someone such as a salesperson must convert the customer wishes into conditions pertaining to product specifications. For example, the need, "I want a personal computer that can connect to the Internet and is capable of high-speed processing," has to be converted into the concrete product specifications, "1.2 GHz CPU processing speed, modem attached." When the salesperson inputs product specifications that represent the wishes, products that meet the specifications are retrieved from the foregoing merchandise DB.

In order to search for merchandise from the merchandise DB by the method just described, salespersons must be thoroughly acquainted with a variety of product specifications. In practice, however, coming to terms with product specifications for all new products as they are successively developed is difficult. Consequently, technology for supporting salespersons that makes it possible to search easily from a large volume of merchandise for products that accord with customer wishes has been called for.

For example, technology that, by converting customer wishes into the form "Select context in which merchandise will be used," makes it so that the wishes may be input has been presented. Utilizing this technology, merchandise having specifications that correspond to an established context may be selected mechanically from the merchandise-information DB. Nevertheless, coordination of customer wishes by correlating like contexts has not been done, and neither has prediction of potential customer wishes.

Because customers' motivation to purchase merchandise lies in the midst of the involvements between merchandise and customers' lives, leading customers to purchases merely by explaining merchandise attributes is difficult. Accordingly, it would be desirable for salespersons to be able to select and offer to customers merchandise by taking into consideration various situations relevant to merchandise and to customers' lives. However, with such complicated merchandise as represented by computers, the products, and how they are used and desired, are varied and complex, which in the merchandise-sales context demands sophisticated knowledge. Consequently, presenting—to a group of customers having a wide variety of wishes—high-quality sales service that by offering merchandise suited to customer wishes assists customer purchasing turns out to be difficult.

Moreover, in order to draw out customers' potential wishes, it would be desirable to realize: 1) coordination and correlation of piecemeal wishes obtained from customers; 2) searching for merchandise suited to those wishes; and 3) administration of message text and of informational resources, used when salespersons and sales agents have dialogues with customers, by correlating the text and resources with customer wishes.

BRIEF SUMMARY OF THE INVENTION

An object of the present invention is to provide sales-support technology for searching for merchandise that matches customer needs.

In order to resolve the foregoing issues, a first aspect of the present invention provides a needs-information architecting method that includes the following steps:

a node-net storing step of storing a node net made up of node-identifying information for specifying nodes, merchandise features for expressing features of merchandise from perspectives of users of the merchandise, correspondences between the node-identifying information and the merchandise features, link-identifying information for identifying links joining two nodes, and correspondences between node-identifying information for linked two nodes and link-identifying information for links joining the two nodes;

an output step of outputting the node net; and a needs acceptance step of accepting selection of any of the nodes, and accepting input of needs information expressing customer needs for the merchandise features.

This method is for example adopted in a portable computer that a salesperson has with him or her. Merchandise features are not so-called product specs but rather are features such as users recognize in using the merchandise. If the merchandise is portable terminals for example, features such as "connectable to the Net," "use e-mail," or "use e-mail on the bullet train" may be cited. The merchandise features for two nodes joined by one link may lend directivity to the link such that relatively the one end is more specific than the other. Comparing the "use e-mail" and "use e-mail on the bullet train" that are merchandise features of mobile terminals, for example, the latter would be a more specific feature than the former. A salesperson while viewing a node net selects nodes that fit a customer's needs, and inputs the customer needs information.

The needs-information architecting method according to this first aspect of the present invention may further include a conveyance step of having inputted needs information conveyed along the links to create needs information regarding nodes for which needs information has not been input.

Inputting needs information with respect to a single node conveys that information to other nodes.

In the needs-information architecting method according to the first aspect of the invention, the needs information may contain significance levels indicating just how important a customer regards each merchandise feature corresponding to a node on the node net.

The significance levels are established with numerical values in a range from 0 to 100, for example.

Likewise, in the needs-information architecting method as set forth by the first aspect of the invention, the needs information may further contain conviction levels indicating just how certain the significance levels are.

The conviction levels are established with numerical values in a range from 0 to 100, for example.

Further, the needs-information architecting method according to the present invention in its first aspect may include a conveyance step of conveying, along the links and based on the conviction levels, input needs information to create needs information regarding nodes for which needs information has not been input.

A method that may be given as an example is lending links general/specific directivity, in which case a significance level going toward general is conveyed at the value it is, and going toward specific is reduced while being conveyed.

A second aspect of the present invention provides the needs-information architecting method set out in the first aspect, but which further includes the following steps:

a support-information storing step of storing the node-identifying information or the link-identifying information, support information being in order to support gathering of needs information from a customer, and correspondences between the support information and the node-identifying information or the link-identifying information; and a support request step of accepting selection of any node or link, and accepting a demand for output of support information corresponding to the selected node or link.

In this method, the output step further outputs the support information corresponding to the node-identifying information for the selected node or to the link-identifying for the selected link.

Message expressions such as "Don't you think it would be nice to be able to watch DVDs on the bullet train?" and links to the (World-Wide) Web may be cited as support information. Utilizing support information enables salespersons to ferret out customers' needs further.

The needs-information architecting method according to this second aspect of the present invention may further include: a conveyance step of conveying inputted needs information along the links to create needs information regarding nodes for which needs information has not been input; a display-conditions storing step of storing display conditions that are conditions being in order to output support information suited to the customer's needs, and storing correspondences between the display conditions and the support information; and a support step of determining based on needs information input and/or conveyed to every node, and on the display conditions, whether support information corresponding to the selected node or link is to be output, and if support information is to be output, determining the support information. In this case the output step outputs the support information in accordance with the determinations in the support step.

The display conditions for example might be configured to be wherein the significance level is below a threshold value. In this case, support information regarding nodes for which significance level has neither been inputted nor conveyed would be output. Salespersons accordingly would be able to view just the necessary support information.

Further, the needs-information architecting method according to the invention in its second aspect may include: a merchandise-information storing step of storing merchandise information representing merchandise specifications, merchandise IDs specifying merchandise, and correspondences between the merchandise information and the merchandise IDs; and a criteria storing step of storing evaluation criteria that serve as standards for judging to what extent a product specified by an arbitrary merchandise ID matches merchandise features for a given node, and correspondences between the evaluation criteria and the node-identifying information for the node.

Evaluation criteria are provided for every one of any number of nodes. The evaluation criteria are utilized to judge to what extent a product has the merchandise features for each node.

The needs-information architecting method according to the second aspect of the invention may further include: a suitability step of, regarding a first product specified with an arbitrary merchandise ID contained in the merchandise IDs, calculating the first product's level of suitability for every node having evaluation criteria, based on the evaluation criteria and the merchandise information for the first product.

To what extent a given product matches the merchandise features for a node is calculated according to the evaluation criteria for each node.

In the second aspect of the invention a needs-information architecting method may further include a relevance step of calculating levels of relevance between each node and the first product, based on the suitability levels calculated for every node having evaluation criteria; wherein the output step further outputs the relevance levels.

For example, if a suitability level that goes to a given node is more than a predetermined value, a merchandise feature is judged "relevant" to a product, and conversely, if less than the predetermined value, a merchandise feature is judged "irrelevant" to the product.

Still further, the needs-information architecting method according to the second aspect of the present invention may further include a uniting step of calculating, based on the suitability levels calculated for every node having evaluation criteria, a combined suitability level indicating to what extent the first product matches the customer needs information; wherein the output step further outputs the combined suitability level.

A combined suitability level is calculated by consolidating suitability levels that go to nodes possessing evaluation criteria. Suitability levels for nodes not possessing evaluation criteria may be deduced from suitability levels for nodes possessing evaluation criteria and utilized in calculating the combined suitability level.

In the second aspect of the invention a needs-information architecting method may yet further include an optimal merchandise step of determining a single product whose combined suitability level is highest ("best-suited product" hereinafter) by executing the suitability step and the uniting step with respect to all or a part of merchandise defined by the merchandise information stored in the merchandise-information storing step; wherein the output step further outputs the merchandise information for the best-suited product.

A product whose combined suitability level is highest from among a plurality of products is determined and output. Salespersons may readily seek merchandise most befitting a customer's various needs.

Further steps that may be included in a needs-information architecting method under the present invention in its second aspect include: a conveyance step of conveying inputted needs information along the links to create needs information regarding nodes for which needs information has not been input; a customer recording step of storing the inputted needs information and/or the conveyed needs information, customer IDs specifying customers, and correspondences between the needs information, the node-identifying information, and the customer IDs; and a customer-designating step of accepting designation of a customer ID. In this case the output step further outputs, together with the node net, needs information corresponding to the designated customer ID.

This method stores acquired customer needs as customer information. The stored customer information is re-output on the node net, and is utilized in deducing needs information for other customers.

A third aspect of the present invention provides a computer-readable recording medium on which a needs-information architecting program is recorded for executing the following steps:

a node-net storing step of storing a node net made up of node-identifying information for specifying nodes, merchandise features for expressing features of merchandise from perspectives of users of the merchandise, correspondences between the node-identifying information and the merchandise features, link-identifying information for identifying links joining two nodes, and correspondences between node-identifying information for linked two nodes and link-identifying information for links joining the two nodes;

an output step of outputting the node net; and a needs acceptance step of accepting selection of any of the nodes, and accepting input of needs information expressing customer needs for the merchandise features.

A fourth aspect of the present invention provides a needs-information-architecting computer product for causing a computer to function as the following means:

node-net storing means for storing a node net made up of node-identifying information for specifying nodes, merchandise features for expressing features of merchandise from perspectives of users of the merchandise, correspondences between the node-identifying information and the merchandise features, link-identifying information for identifying links joining two nodes, and correspondences between node-identifying information for linked two nodes and link-identifying information for links joining the two nodes;

output means for outputting the node net; and needs acceptance means for accepting selection of any of the nodes, and accepting input of needs information expressing customer needs for the merchandise features.

A fifth aspect of the present invention provides a needs-information architecting device equipped with the following means:

node-net storing means for storing a node net made up of node-identifying information for specifying nodes, merchandise features for expressing features of merchandise from perspectives of users of the merchandise, correspondences between the node-identifying information and the merchandise features, link-identifying information for identifying links joining two nodes, and correspondences between node-identifying information for linked two nodes and link-identifying information for links joining the two nodes;

output means for outputting the node net; and needs acceptance means for accepting selection of any of the nodes, and accepting input of needs information expressing customer needs for the merchandise features.

From the following detailed description in conjunction with the accompanying drawings, the foregoing and other objects, features, aspects and advantages of the present invention will become readily apparent to those skilled in the art.

BRIEF DESCRIPTION OF SEVERAL VIEWS OF THE DRAWINGS

FIG. 7 is a conceptual explanatory diagram of information stored in a message DB;

FIG. 9 is an explanatory diagram showing examples of evaluation criteria: (a) is an example of an evaluation criterion that is scoring according to ranges of values, (b) is an example of an evaluation criterion by which an attribute value is changed into a score utilizing a conversion formula, and (c) is an example of an evaluation criterion that assigns correspondences between values and scores;

FIG. 10 is an explanatory diagram representing an example of selecting most appropriate merchandise;

DETAILED DESCRIPTION OF THE INVENTION

First Embodiment Example

Outline

The present invention defines a "topic net" (equivalent to a node network), that includes topics (equivalent to merchandise features), links that link topics, and topic IDs (corresponding to node-identifying information) for discriminating topics. Topics represent merchandise features from the perspective of customers' lives. In other words, topics are not so-called product specs, but rather are features of merchandise, which if computers would be "connect to a network," or "size that fits into a bag," for example. Links exist between topics, and represent relationships between the generalization and individualization of merchandise features. In the present invention, customer needs information is configured in the topic net. A topic net in which needs information has been defined may be utilized in applications such as: 1) seeking out customer needs; 2) determining from the sought-out needs the most appropriate merchandise for a customer; 3) storing customer needs; and 4) anticipating other customer needs based on the stored customer needs.

Configuration

Figure 1:
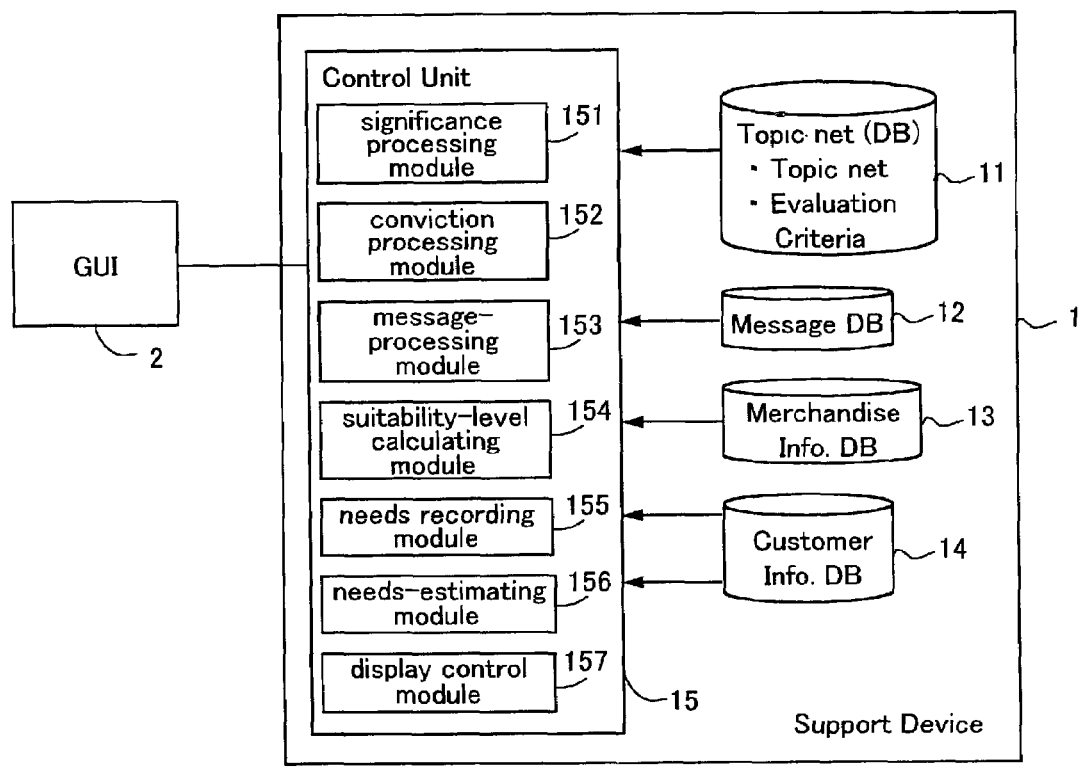
FIG. 1 is a configuration for a sales-support system having to do with a first embodiment example.

FIG. 1 sets forth the configuration of a sales-support system having to do with the present embodiment example. The sales-support system is configured with a support device 1, and a GUI (graphical user interface) 2. The support device 1 and the GUI 2 may be on a single computer terminal, or may respectively be on separate computer terminals. The support device 1 has a topic-net data base (DB) 11, a message DB 12, a merchandise information DB 13, a customer information DB 14 and a control unit 15. The GUI 2 operates to display the topic net. With reference to a specific example of a topic net, the information stored in the databases, and the functions of the control unit 15 and the GUI 2 will be explained in the following. For ease of explanation, utilizing a topic net for a notebook PC, a case in which a notebook PC most appropriate for a customer's needs is sought will be illustrated below.

I. Configuring Needs Information

Figure 2:
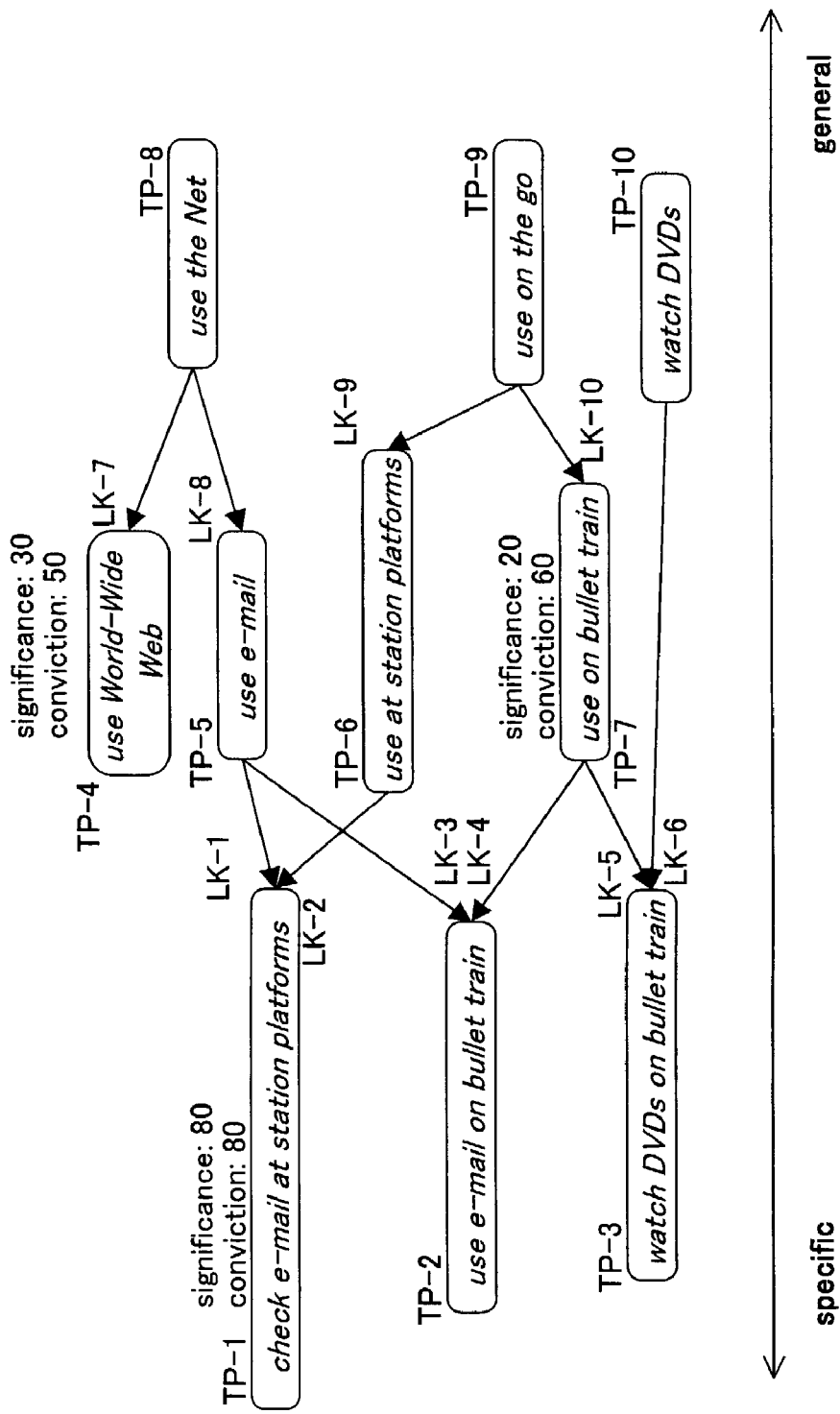
FIG. 2 is a conceptual explanatory diagram of a topic net configured with significance and conviction levels.

FIG. 2 is a conceptual explanatory diagram of a topic net configured with needs information. First, the topic net will be specifically described. Topics that represent merchandise features from the customer's perspective are identified by topic IDs "TP-1," "TP-2," . . . . The links are identified with link IDs "LK-1," "LK-2," . . . . Links between the topics in this topic net represent generalizing/individualizing relationships present between topics. In other words, between two topics A and B joined by a single link, topic A on the one hand represents merchandise features more specific than does topic B on the other hand. Following the same link in the reverse direction, topic B represents merchandise features more general than does topic A on the other hand. For example, link LK-8 joining topic TP-5, "use e-mail," and topic TP-8, "use the Net," represents that the former is more specific than the latter, and that the latter is more general than the former.

Where there are a plurality of topics B, C, . . . more individualized than a given topic A, base topic A represents merchandise features in common with all the topics B, C, . . . that are more general than they are. For example, topic TP-5, "use e-mail," is linked with the more individualized topics TP-1, "check e-mail at station platforms," and TP-2, "use e-mail on the bullet train." Topic TP-5, "use e-mail," is a merchandise feature that is in common with topics TP-1 and TP-2, and that is more general than these two.

Conversely, where there are a plurality of topics B, C, . . . more generalized than a given topic A, base topic A represents merchandise features in common with all the topics B, C, . . . that are more specific than they are. For example, topic TP-2, "use e-mail on the bullet train," is linked with the more generalized topics TP-5, "use e-mail," and TP-7, "use on the bullet train." Topic TP-2, "use e-mail on the bullet train," is a merchandise feature that is in common with topics TP-5 and TP-7, and that is more specific than these two. Topic nets of this sort—such as a notebook PC topic net, a mobile phone topic net, and a fax topic net—are prepared for each merchandise category. At least one topic net is stored in the topic net DB 11.

Next, configuring of needs information in a topic net will be explained. Topic significance level is utilized as needs information. By setting significance level with respect to a topic, just how important the customer regards the merchandise feature that that topic represents may be expressed on the topic net. Likewise, in addition topic significance level, conviction level may be included in the needs information. By means of the conviction level, the significance level's certainty may be expressed in the topic net. The significance and conviction levels may be expressed with numerals such as 0 through 1, or from 0 to 100. In the following, the significance and conviction levels are collectively referred to as needs information, and are expressed with numerals 0 to 100.

Needs information is configured by someone, such as a salesperson, who has a dialogue with a customer inputting each topic utilizing the GUI 2. The significance level with respect to a given topic may be conveyed to another topic. Conveying topic significance levels enables significance levels to be configured even with respect to topics for which customer needs information has not been directly input. For conveying significance level, a number of ways are conceivable.

Figure 3:
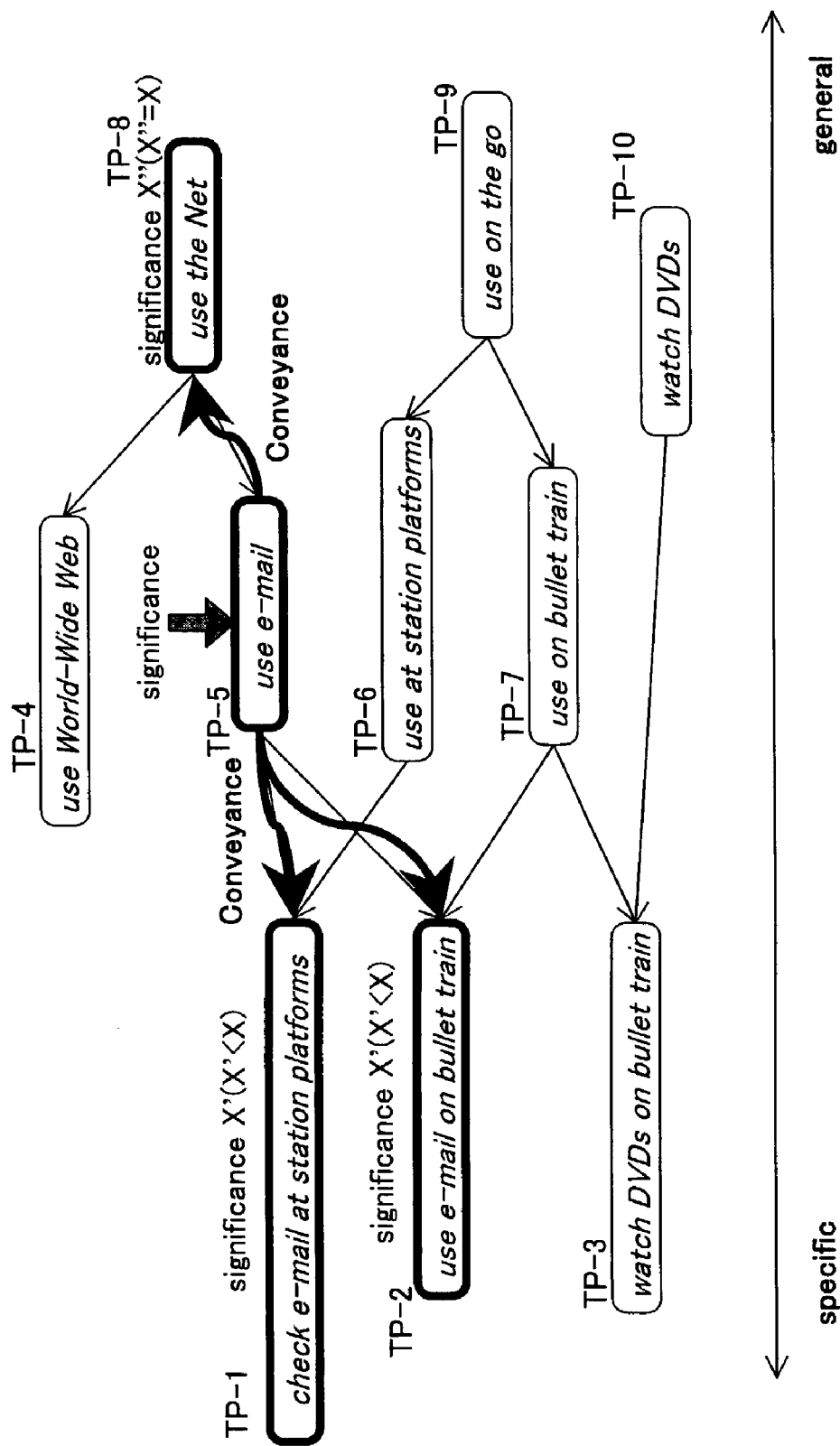
FIG. 3 is an explanatory diagram representing significance-level conveyance.

FIG. 3 represents one example of a method for significance-level conveyance. FIG. 3 indicates that setting significance level X for topic TP-5 sets significance level X" for topic TP-8 generalizing that topic, identically (X"=X) with significance level X for the base topic TP-5. This is because generalized topic TP-8 is a merchandise feature that includes the content of base topic TP-5. Likewise, FIG. 3 indicates significance level X' for topics TP-1 and TP-2 individualizing base topic TP-5 being set lower (X"<X) than significance level X for base topic TP-5.

Figure 4:
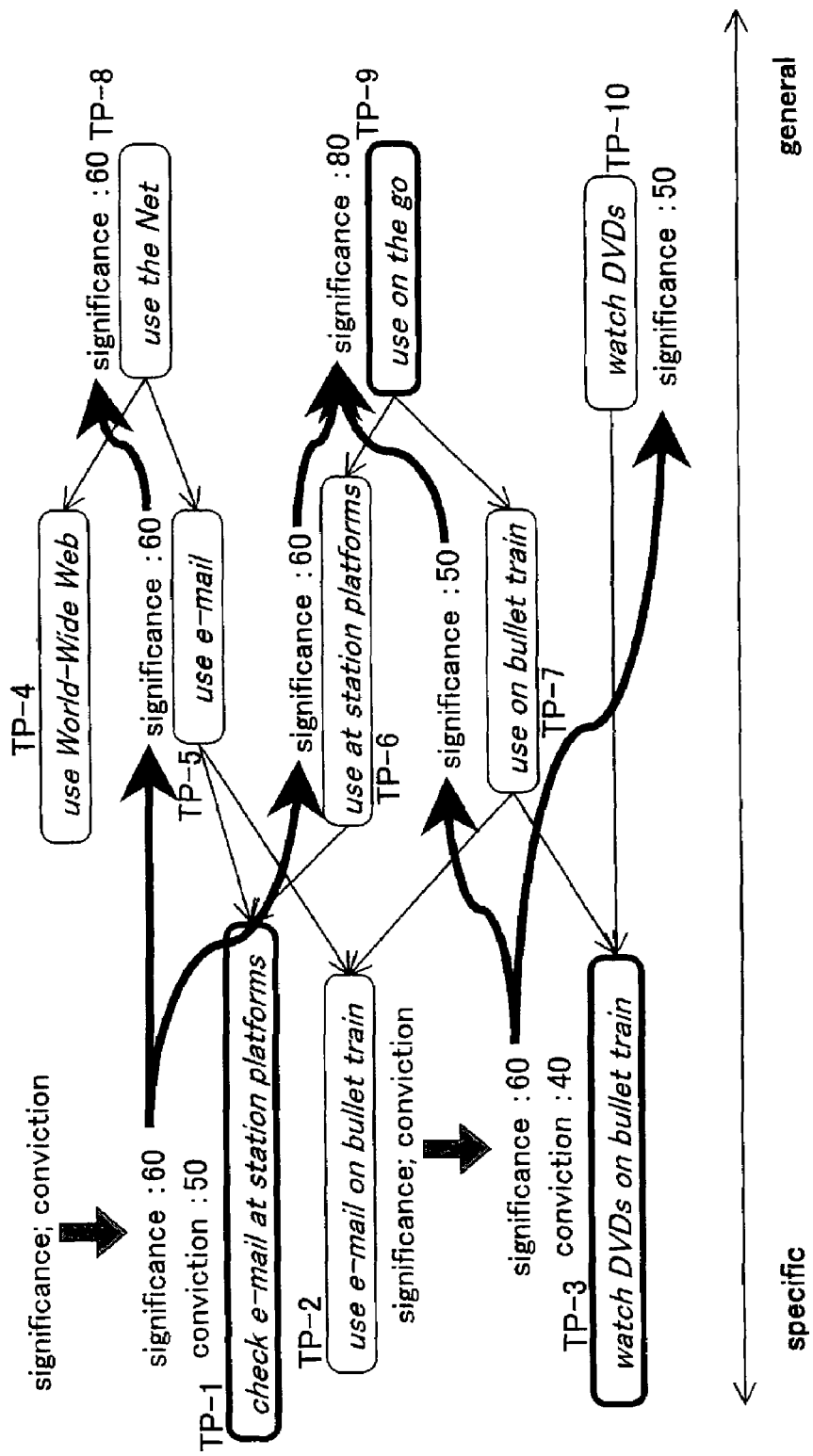
FIG. 4 is an explanatory diagram representing significance-level conveyance (toward general) and superimposition of conveyed significance level.

Using FIGS. 4 and 5, the method for significance-level conveyance will be explained in further detail. FIG. 4 indicates the significance level input for a given topic TP-1 being conveyed as it is to all of topics TP-5, TP-6, TP-8 and TP-9, which are more general than topic TP-1. Herein, topics TP-8 and TP-9 are not directly linked with base topic TP-1. However, via topics TP-5 and TP-6 that are directly linked with topic TP-1, the significance level for topic TP-1 is conveyed as it is to topics TP-8 and TP-9.

Likewise, FIG. 4 indicates conveyed significance levels mutually being superimposed. Where for example significance levels for topic TP-1, "check e-mail at station platforms," and topic TP-3, "watch DVDs on the bullet train," have been input, the significance levels for the two are conveyed and superimposed with topic TP-9, "use on the go." As a result, the significance level for topic TP-9 is made higher than those of topics TP-8 and TP-10 on which superimposition has not been effected. Specifically, where the significance levels "60" and "50" for topics TP-1 and TP-3 have been input, significance level 60 and significance level 50 are conveyed to topic TP-9. As a result, topic the TP-9 significance level becomes a value in which significance levels 60 and 50 are superimposed, and that is higher than both, 60 and 50, e.g., 80. Doing so facilitates comprehension by generalizing a customer's wishes from piecemeal information on the customer's needs. In this example, the customer's wish may be assumed to be along the lines of "use on the go."

Another method that may be given as example of a way to convey significance level utilizes formula (1) below to determine significance level X conveyed to a general topic that shares a plurality of specific topics in common.

$$X = [1-(1-X_1/100)(1-X_2/100)(1-X_3/100)\ldots] \times 100 \tag{1}$$

Here, $X_1, X_2, X_3, \ldots$ are the respective significance levels for a plurality of specific topics having a general topic in common. For example, in FIG. 4, supposing that significance levels 60 and 50 are respectively input for topic TP-1 and topic TP-2, and given that the two topics have general topic TP-5 in common, then significance level $X_5$ for topic TP-5 is calculated as follows.

$$X_5 = [1-(1-60/100)(1-50/100)] \times 100 = 80$$

Figure 5:
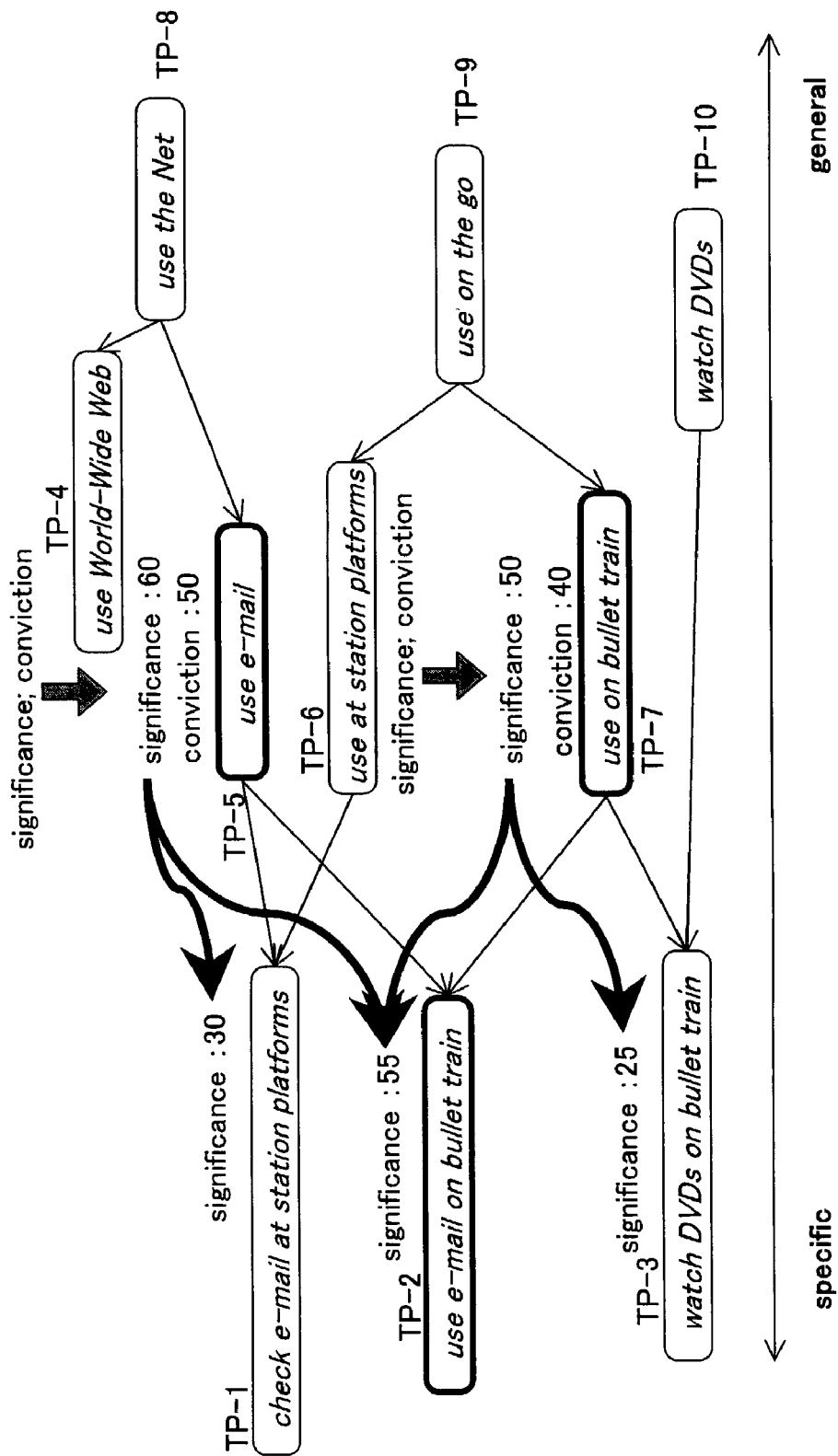
FIG. 5 is an explanatory diagram representing significance-level conveyance (toward specific) and superimposition of conveyed significance level.

FIG. 5 represents significance level input for a given topic TP-5 being depreciated while conveyed to each of topics TP-1 and TP-2 more general than topic TP-5. For example, a significance level of 60 for topic TP-5 is depreciated to "30" by being conveyed to topic TP-1; a significance level of 50 for topic TP-7 is depreciated to "25" by being conveyed to topic TP-3.

Likewise, FIG. 5 represents, in a situation in which significance levels have been set for a plurality of topics, significance levels being superimposed conveyed to a topic in common with and more specific than the plurality. For example, by inputting significance levels for topic TP-5, "use e-mail," and topic TP-7, "use on the bullet train," the respective significance levels are conveyed to and superimposed on general topic TP-2, "use e-mail on the bullet train," that is in common with the two. The superimposition heightens the significance level of topic TP-2, and highlights the topic's importance. That is, heightening the significance level of a more specific topic that is in common with a topic whose significance level has been input lets the importance of the more specific topic be brought to the fore.

Conviction level may be utilized in conveyance and superimposition of significance level. In particular, significance levels that in FIGS. 4 and 5 are conveyed may be weighted by multiplying by conviction level/100. Specifically, in FIG. 5, wherein the significance level for topic TP-5 is 60 and its conviction level is 50, the significance level $X_1$ for topic TP-1 may be calculated as in formula (2) below. Likewise, in cases shown in FIGS. 4 and 5 in which significance levels being conveyed are superimposed, they may be weighted with the conviction levels. Specifically, in FIG. 5, wherein the significance level for topic TP-5 is 60 and its conviction level is 50, and the significance level for topic TP-7 is 50 and its conviction level is 40, the significance level $X_2$ for topic TP-2 may be calculated as in formula (3) below. While the following formulas are single examples of conveyance and superimposition of significance level, other formulas may be utilized to make the calculations.

$$X_1 = 60 \times 50/100 \qquad (2)$$

$$X_2 = (60 \times 50 + 50 \times 40)/(50+40) \qquad (3)$$

The receipt of significance-level input and the conveyance of significance level described in the foregoing are carried out by a significance processing module 151 in the control unit 15. Likewise, receipt of conviction-level input is carried out by a conviction processing module 152 in the control unit 15.

II. Message Expressions Correlated with the Topic Net

Figure 6:
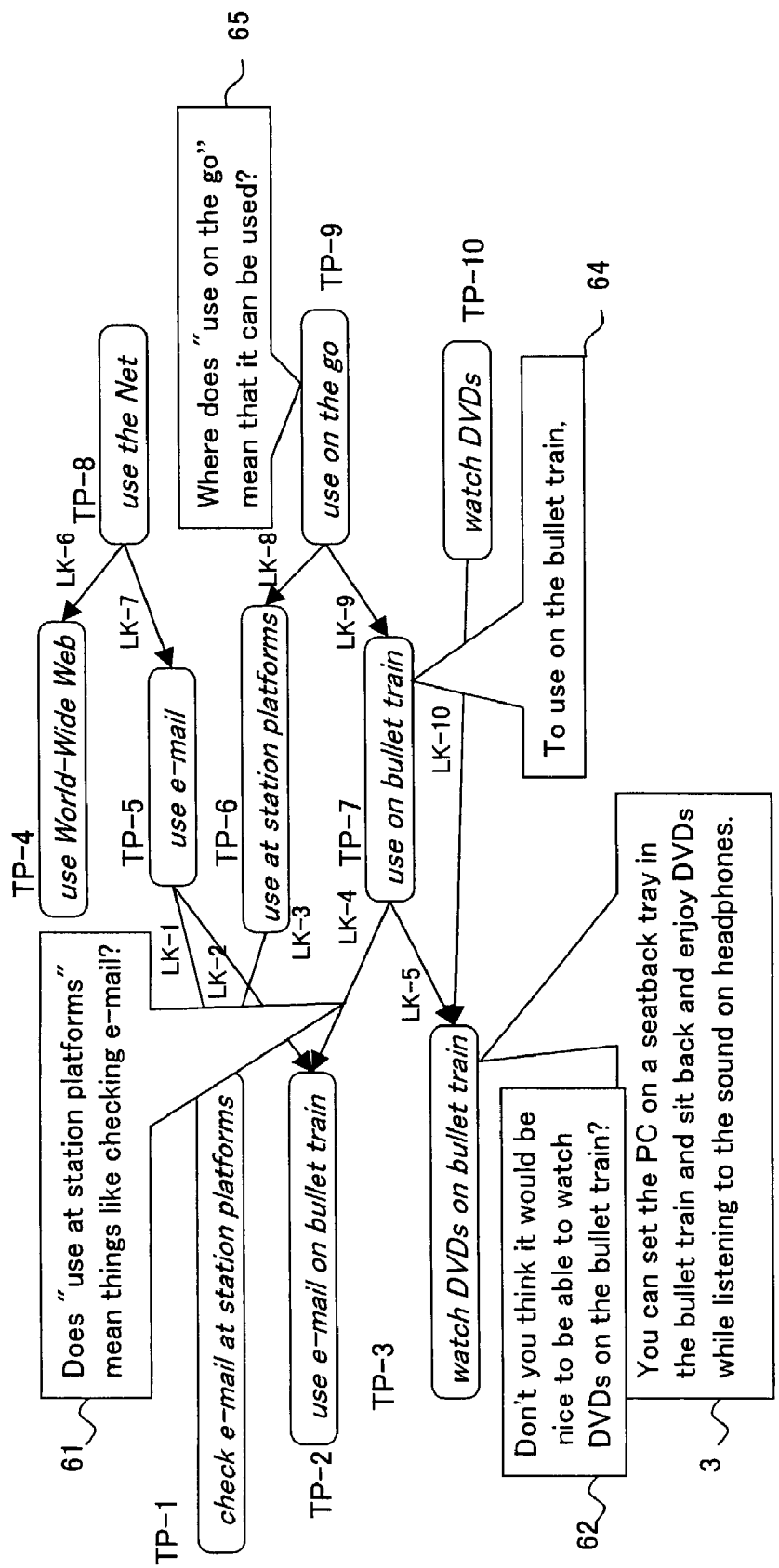
FIG. 6 is an explanatory diagram illustrating one example of message expressions correlated with a topic net.

FIG. 6 is an explanatory diagram illustrating message expressions correlated with the topic net. "Message expressions" are chiefly texts for salespersons to search for relevance between merchandise features that topics express, and customer needs. Explanations, suggestions, questions, and confirmations are conceivable texts. Further, image and voice information usable in explanations and questions, and links to the World-Wide Web, maybe used together with the text, or independently, as message expressions. Displaying message expressions in correlation with the topic net assists a salesperson who holds a dialogue with a customer in seeking out needs information.

Some message expressions correspond to topics, and some correspond to links. Likewise, in some instances a plurality of message expressions correspond to a singe link or topic. For example, message expression 61 in FIG. 6 corresponds to link LK-4 joining the two topics TP-6 and TP-2. Message expressions 62 and 63 correspond to topic TP-3. Therein, display conditions for displaying message expressions are preferably assigned correspondences to and stored with the message expressions. In the present embodiment example, based on the needs information at the point when the message expression that is to be displayed is retrieved, whether the display conditions are met is decided, and the message expression for display is determined.

FIG. 7 is a conceptual explanatory diagram of information stored in message DB 12. Message expressions, topic IDs or link IDs corresponding to the message expression, and display conditions are recorded in the message DB 12. For instance, message expression, "Don't you think it would nice to be able to watch DVDs on the bullet train?" corresponds to topic TP-3, "watch DVDs on bullet train." The condition under which this message expression is displayed is wherein the significance level for this topic TP-3 is less than 50, or the conviction level is less than 50. The reason for this is because if the significance level for this topic TP-3 is already high, with that fact being certain a user's needs relative to the merchandise features are understood, and therefore the message expression is unnecessary. The process of displaying message expressions is carried out by a message-processing module 153 in the control unit 15.

III. Determining Merchandise Most Appropriate

Figures 8A, 8B, 8C:
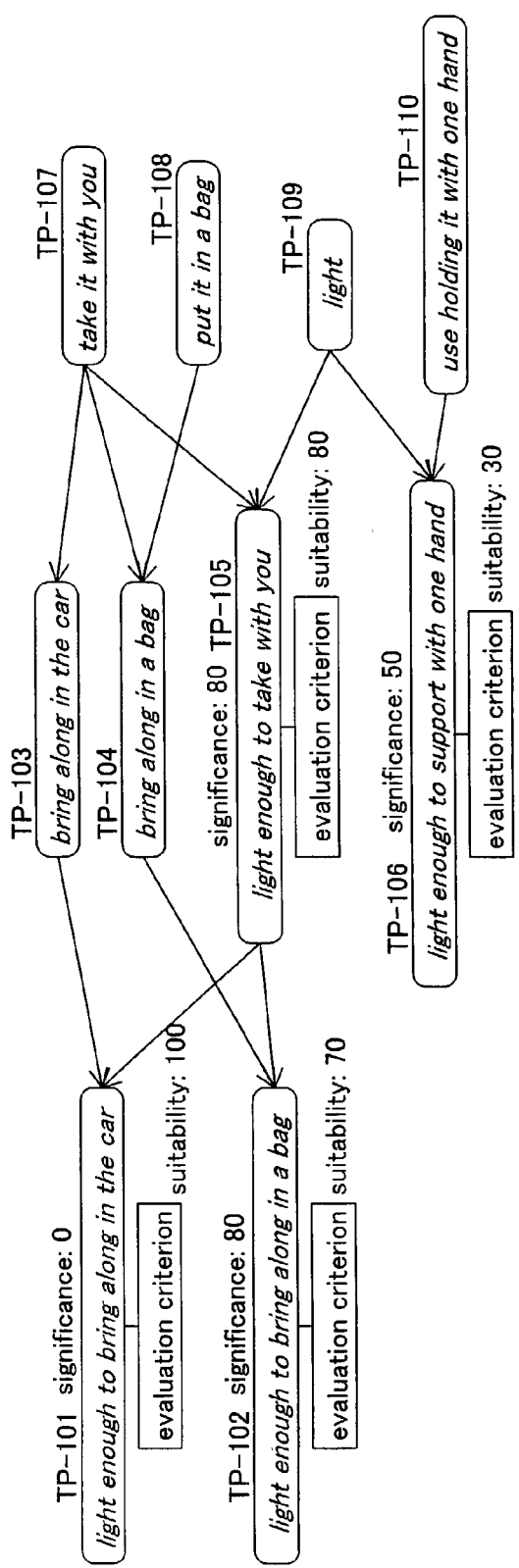
FIG. 8(a) is an explanatory diagram representing the configuring of evaluation criteria that go to a topic net, (b) is a conceptual explanatory diagram of information stored in a merchandise information DB, and (c) is an explanatory diagram illustrating an instance of calculating a combined suitability level for given product A.

Next, utilizing needs information configured in the topic net to determine merchandise most appropriate for a customer will be explained. Evaluation criteria are configured in the topic net in order to determine merchandise best suited to a customer's needs. FIG. 8(*a*) is an explanatory diagram representing a topic net in which evaluation criteria are configured. A topic is configured with evaluation criteria entirely or in part. In this figure, several topics are configured with evaluation criteria. Evaluation criteria are criteria for calculating suitability levels that represent to what extent merchandise has the product features that a topic expresses. Suitability level is in this figure expressed by numerical values 0 to 100. Suitability levels for each topic are determined with respect to given merchandise based on the evaluation criteria for the topic and on product information for the merchandise. Furthermore, suitability levels may be reckoned by taking needs information into consideration.

FIG. 8(*c*) illustrates an instance in which a combined suitability level is calculated for given product A. When suitability levels for each of the topics about product A are calculated, they are united to calculate a combined suitability level for product A. Not only may a sum total be taken that is the suitability levels simply, but also the suitability levels for each topic may be weighted by significance level, with the sum total of the weighted suitability levels being the combined suitability level. (See FIG. 8(*c*).)

FIG. 8(*b*) represents an example of merchandise information. The merchandise information contains data expressing product specifications—e.g., merchandise size, weight, LCD resolution, CPU speed. Merchandise information for a variety of diverse merchandise is stored in the merchandise information DB 13. For ease of explanation herein it will be assumed that merchandise information about various notebook PCs is recorded in the merchandise information DB 13.

FIG. 9 is an explanatory diagram showing examples of evaluation criteria. The evaluation criteria differ according to the merchandise features that the topics represent. FIG. 9(*a*) is an evaluation criterion in which suitability level is determined based on ranges of values representing product specifications. In this evaluation criterion, value range is stored, in combination with suitability level. FIG. 9(*b*) is an evaluation criterion in which suitability level is calculated utilizing a conversion formula. FIG. (c) is an example of an evaluation criterion being a table in which product specification has been matched with suitability level. Product specification or product mode is recorded in combination with suitability level. The evaluation criteria are assigned correspondences with topic IDs (this is not illustrated in the figure) and recorded in the topic net DB 11.

FIG. 10 is an example of a list, displayed on the GUI 2, of products in order of combined suitability level wherein, utilizing evaluation criteria exemplified in FIG. 9, combined suitability levels are calculated for a plurality of products of the same type (in this case, notebook PCs). In the present example, a plurality of notebooks PCs is displayed ranked by combined suitability level. Calculating combined suitability levels with respect to a plurality of products of the same type enables estimating with ease the most appropriate merchandise for a customer.

Figure 11:
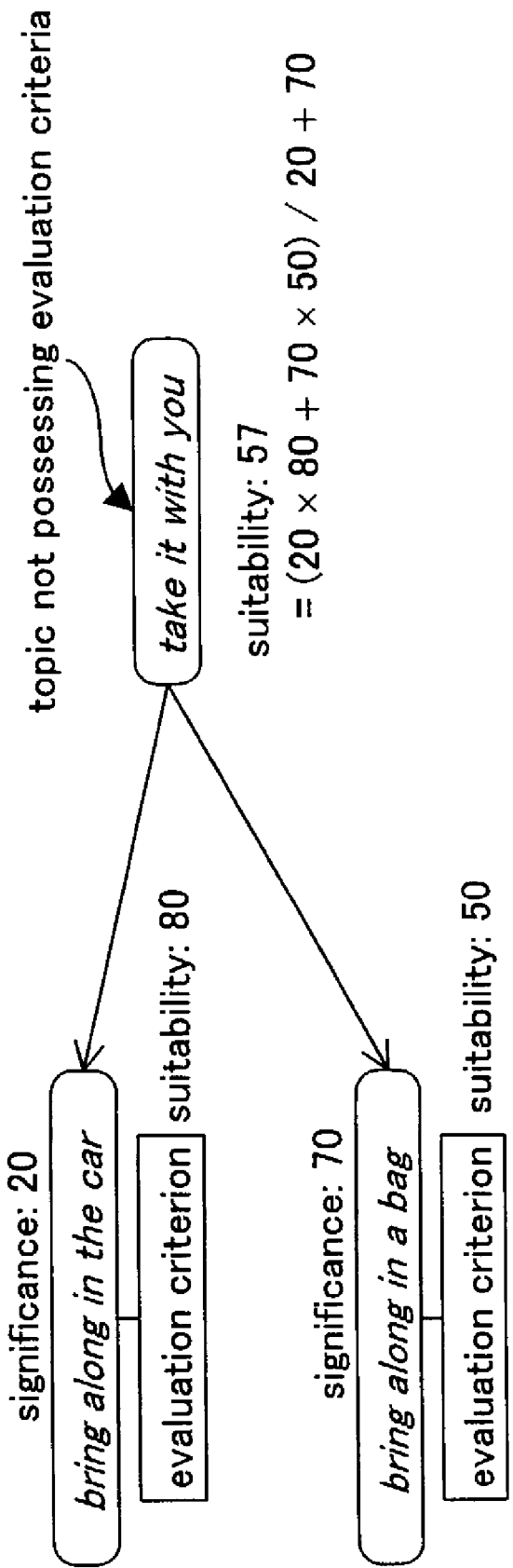
FIG. 11 is an explanatory diagram illustrating an example of calculating suitability level for a topic not possessing evaluation criteria.

FIG. 11 is an explanatory diagram illustrating an example of a method for calculating merchandise suitability level with respect to topics that do not possess evaluation criteria. By estimating suitability levels for topics that do not possess evaluation criteria, merchandise suitability levels may be reckoned with respect to the topics entirely. Based on for example suitability level and significance level for topics that do possess evaluation criteria suitability-level values conceivably could be conveyed to topics that do not have evaluation criteria. In FIG. 11, topics of a plurality in which a topic not possessing an evaluation criterion has been individualized have evaluation criteria. In this case, based on significance level and suitability level for two topics that are specific suitability level for a topic not possessing evaluation criteria is calculated. Herein, suitability level Y for the topic not possessing evaluation criteria is calculated from formula (4) below as one example.

$$Y=(X_1 \times Y_1 + X_2 \times Y_2)/(X_1+X_2) \quad (4)$$

Here, $X_1$, $X_2$ and $Y_1$, $Y_2$ are the significance levels and suitability levels for the two specific topics, which share in common as a general topic the topic not possessing evaluation criteria. By this formula, after weighting the suitability levels of the topics possessing evaluation criteria with the significance levels, their sum total is taken, and the sum total is divided by the sum of the suitability levels. In the foregoing manner, suitability levels may be estimated also for topics not possessing evaluation criteria to reckon merchandise suitability levels with respect to the topics entirely. Thereafter, sum-total suitability levels for the merchandise would be calculated based on each topic's suitability level likewise as described earlier.

The presence/absence of relevance between merchandise and topics is judged based on the topics' calculated suitability levels, and the presence/absence of relevance may be displayed by means of the GUI 2. The presence/absence of relevance between a product and a topic may be judged utilizing, for example, the following formulas (5-1), (5-2) and (5-3).

(suitability−50)>30: relevance present (product suited to topic) (5-1)

(suitability−50)<−30: relevance present (product unsuited to topic) (5-2)

|suitability−50|<30: no relevance (5-3)

If formula (5-1) above is satisfied, to a considerable extent the product has the merchandise feature that the topic expresses. If formula (5-2) above is satisfied, to hardly any extent does the product have the merchandise feature that the topic expresses. If formula (5-3) above is satisfied, whether the product has the merchandise feature that the topic expresses cannot be said. Accordingly, if either (5-1) or (5-2) above is satisfied, the topic may be deemed to have relevance to the product. Likewise, if (5-3) above is satisfied, the topic may be deemed not to have any relevance to the product. The foregoing process is carried out by a suitability-level calculating module 154 in the control unit 15.

IV. Administrating Needs Information

Figure 12:
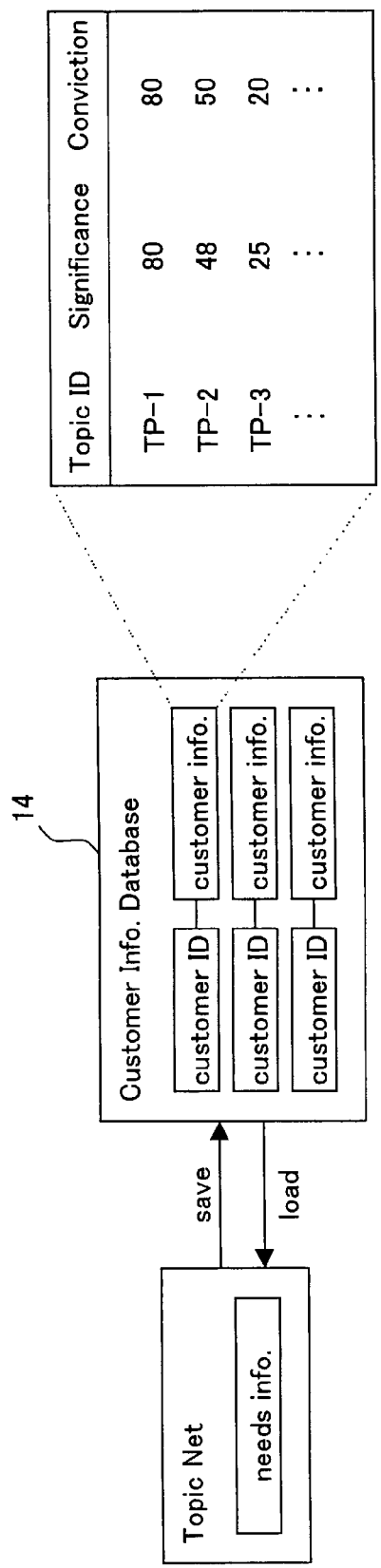
FIG. 12 is a conceptual explanatory diagram of customer information stored in a customer-information DB.

Customer needs may be administrated by storing customer-by-customer needs information configured in a topic net. FIG. 12 is a conceptual explanatory diagram of information stored in the customer-information DB 14. Customer information assigned correspondences with customer IDs identifying customers is stored. The customer information contains topic IDs, needs information, and correspondences between topic IDs and needs information. Wherein a dialogue is carried out with a given customer, 1) input of the customer's customer ID is accepted; 2) needs information corresponding to the input customer ID is loaded into the topic net; and 3) after the dialogue is finished customer information containing the latest needs information is saved in the customer-information DB 14. This process is carried out by a needs recording module 155 in the control unit 15.

V. Estimating Needs

Figure 13:
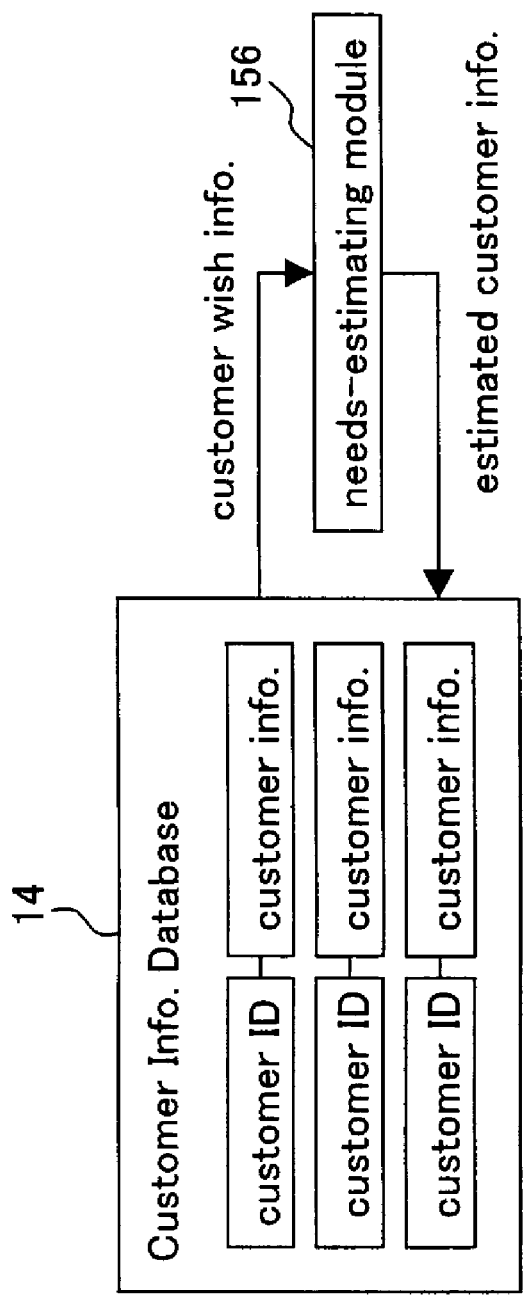
FIG. 13 is an explanatory diagram of deducing needs based on customer information.

Needs information to be learned for customer can be estimated utilizing the customer information stored in the customer-information DB 14. FIG. 13 is an explanatory diagram wherein needs information to be learned is calculated based on the customer-information DB 14. As the computational method, a plurality of information items is read out from the customer-information DB 14 and needs-information calculations are performed utilizing collaborative filtering for example. The computational results are written into the customer-information DB 14 and are displayed on the GUI 2. Wherein for example a number of topic significance levels with respect to a given customer are to be learned, the unknown needs information may be calculated from other customer needs information possessing significance-level distribution resembling that customer's. Further, wherein default values are configured in the significance levels, the significance level for the topic whose significance level is just that default value may be calculated. Likewise, the significance level may be calculated if the conviction level is below a threshold value. The needs-information estimating process is carried out by a needs-estimating module 156 in the control unit 15.

VI. GUI Functions

Figure 14:
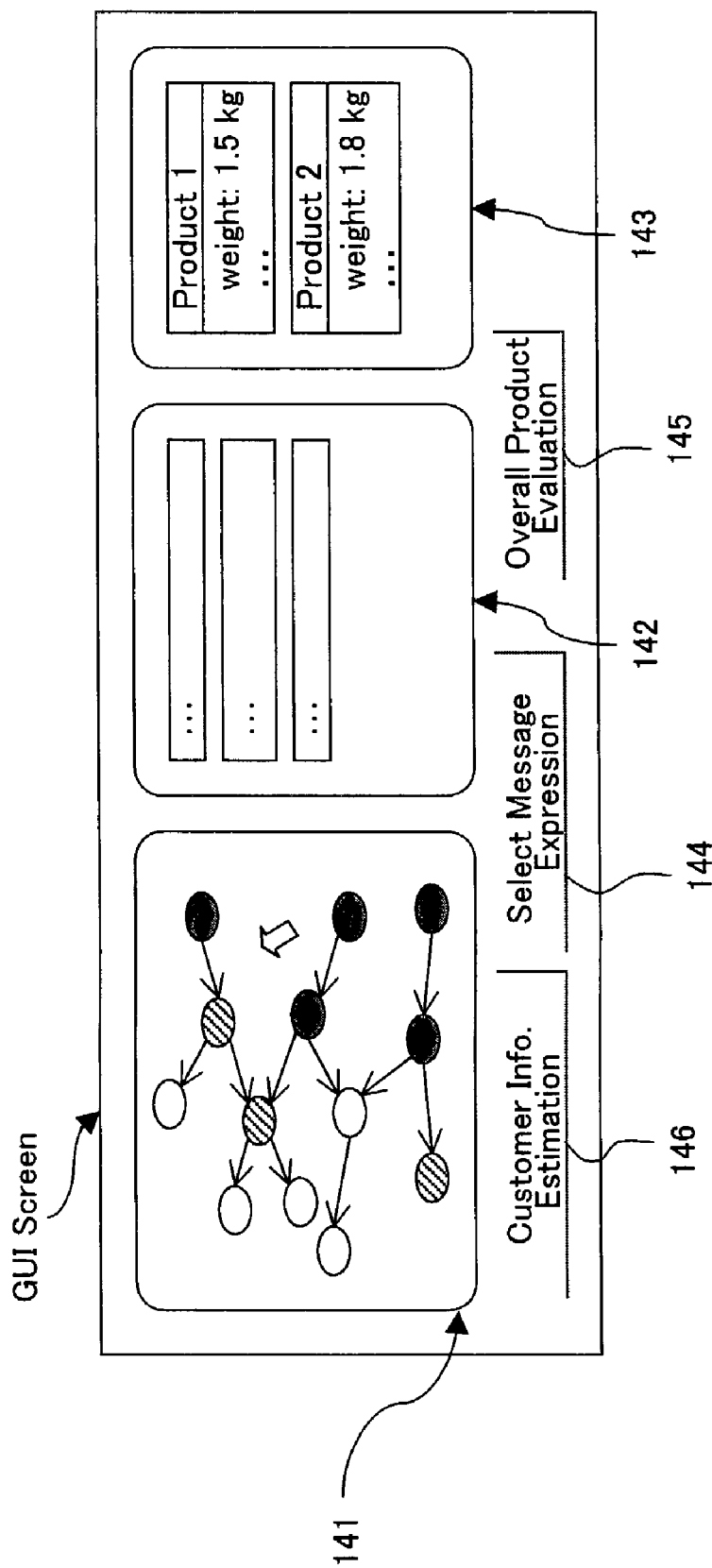
FIG. 14 is an example of a screen displayed by the GUI.

FIG. 14 is an example of a screen displayed by the GUI 2. The screen data displayed on the GUI 2 is computed by a display control module 157. A topic net window 141, a message window 142, a merchandise window 143, a message-expression selection button 144, an overall product-evaluation button 145, and a customer-information estimation button 146 are displayed on the screen. A topic net is displayed in the topic net window 141. Those topics whose significance level is high and those topics whose conviction level is high preferably are displayed emphatically to enable visually distinguishing them from the other topics. Varying the size, varying the color, varying the color intensity, varying the border thickness, or animating, are display methods that for example may be given. Emphatic display of the significance and conviction levels preferably enables them to be distinguished.

Likewise, the topic net window 141 accepts input of significance levels and conviction levels for a topic net. The input is performed by selecting any topic on the topic net being displayed and inputting the significance-level and conviction-level values. Inputting numerical values through a dialogue, or else changing values by scrolling with a scroll bar, are input methods that may be given. Inputting significance levels and conviction levels updates, based on links in the topic net, significance levels and conviction levels for other topics.

When with any topic or link having been selected the message-expression selection button 144 is pressed, a message-expression list is displayed in the message window 142. The message expressions displayed are those message expressions for which the needs information at that moment fulfills the display conditions.

Merchandise information lists stored in the merchandise information DB 13 are displayed in the merchandise window 143. When any product in the merchandise information list is selected, combined suitability level for that product is calculated and displayed on the merchandise information list. Furthermore, topics with a deeper relationship to the product and topics with a thinner relationship are preferably displayed with emphasis. When the overall product-evaluation button 145 is pressed, the products within the merchandise information list are sorted in order of combined suitability level and displayed.

When the customer information estimation button 146 is pressed, based on customer information stored in the customer information DB 14, needs information with respect to topics for which needs information has not been configured is calculated and displayed.

Process in Sales-Support System

Figure 15:
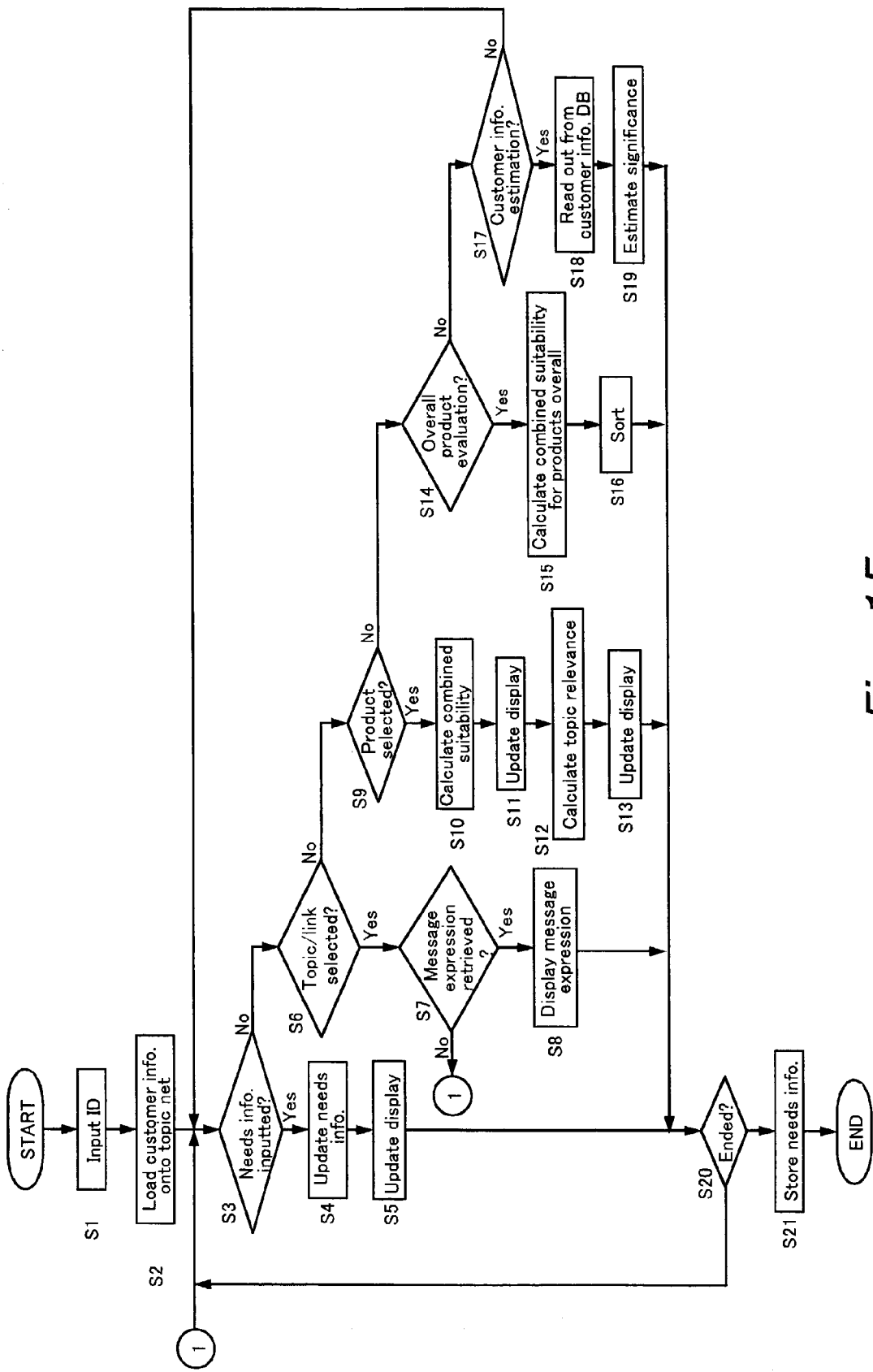
FIG. 15 is a flowchart illustrating flow of a process in the FIG. 1 sales-support system.

FIG. 15 is a flowchart illustrating flow of a process in the present sales-support system. By for example switching on the GUI 2 power source, the following process is launched.

Step S1: The control unit 15 acquires a customer ID that the GUI 2 operator has input on the screen mentioned earlier.

Step S2: The control unit 15 searches the customer information DB 14 with the customer ID as a key and reads out the customer information. Next the control unit 15 reads out the topic net from the topic net DB 11, and loads the customer information onto the topic net, which it displays on the GUI 2.

Step S3: The control unit 15 judges whether or not the GUI 2 operator has made input of needs information on the screen, and if the judgment is "yes," step S4 ensues. In particular, when any topic on the topic net is selected and significance-level and conviction-level values for the selected topic are input, step S4 ensues. If the judgment is "no," later-described step S6 ensues.

Step S4: When significance level and conviction level are input, based on links in the topic net the control unit 15 updates significance level and conviction level for other topics.

Step S5: The control unit 15 displays the latest significance and conviction levels on the screen.

Step S6, S7, S8: The control unit 15 judges whether or not the GUI 2 operator has selected any topic or link on the screen (S6). If the judgment is "yes," the control unit 15 judges whether or not the message-expression selection button 144 has been pressed (S7), for example. If the judgment is "yes," the control unit 15 displays a message-expression list. The displayed message expressions are those message expressions for which the needs information matches the display conditions at the moment the message-expression selection button 144 is pressed. If neither a topic nor a link selection has been made, step S9 ensues. Likewise, even if a selection has been made, but the message-expression selection button 144 has not been pressed, the process flow returns to the foregoing step S3.

Step S9-S13: When the GUI 2 operator has selected any product from the merchandise information list (S9), the control unit 15 calculates the combined suitability level for that product (S10), and displays it in the merchandise information list (S11). Further, the control unit 15 calculates the presence/absence of relevance between the selected product and the topics (S12), and displays the results of the calculations on the GUI 2 (S13). For example the control unit 15 emphatically displays topics having a deeper relationship to the product and topics having a thinner relationship so that the two can be told apart.

Step S14-16: The control unit 15 judges whether or not the GUI 2 operator has pressed the overall product-evaluation button 145 (S14). If the judgment is "yes," the control unit 15 calculates the combined suitability levels for the products in the merchandise information list (S15), and sorts and displays the products in order of combined suitability level (S16). Products ranked most appropriate to the customer's needs are consequently displayed on the GUI 2. (See earlier-described FIG. 10.) If the judgment is "no," step S17 ensues.

Step S17-19: The control unit 15 judges whether or not the GUI 2 operator has pressed customer-information estimation button 146 (S17). If the judgment is "yes," the control unit 15 reads out customer information form the customer information DB 14 (S18) and calculates significance levels for any number of topics (Sl9). The topics that are calculation targets are topics whose conviction level is just the default, or topics whose conviction level is lower than a predetermined threshold value. This process is performed by a needs estimation function of the control unit 15.

Step S20: The control unit 15 judges whether or not the process has ended. For example when a power-source button on the GUI 2 goes off the judgment is "yes," and step S21 ensues. When the judgment is "no," the process flow returns once more to step S3, and the foregoing process is repeated.

Step S21: The control unit 15 assigns corresponds between and writes into the customer information DB 14 the customer ID, and the topic IDs and the latest suitability levels and conviction levels for each topic, and ends the process.

Other Embodiment Examples (A) In the foregoing first embodiment example, only a single topic net is stored in the topic net DB 11, wherein merchandise information regarding just one kind of product (e.g., notebook PCs) is recorded in the merchandise information DB 13. Nevertheless, a plurality of topic nets corresponding to a plurality of merchandise types may be stored in the topic net DB 11. In that case, merchandise information for a plurality of types of merchandise in correspondence with topic nets is stored in the merchandise information DB 13. Supposing for example that stored are topic nets regarding the three kinds of merchandise notebook PCs, mobile phones and faxes, in this case merchandise information with respect to the three kinds of merchandise on products that various product providers offer would be stored in the merchandise information DB 13. The control unit 15 accepts designation of merchandise type, and reads out the topic net and merchandise information that corresponds to the designated merchandise type.

Figure 16:
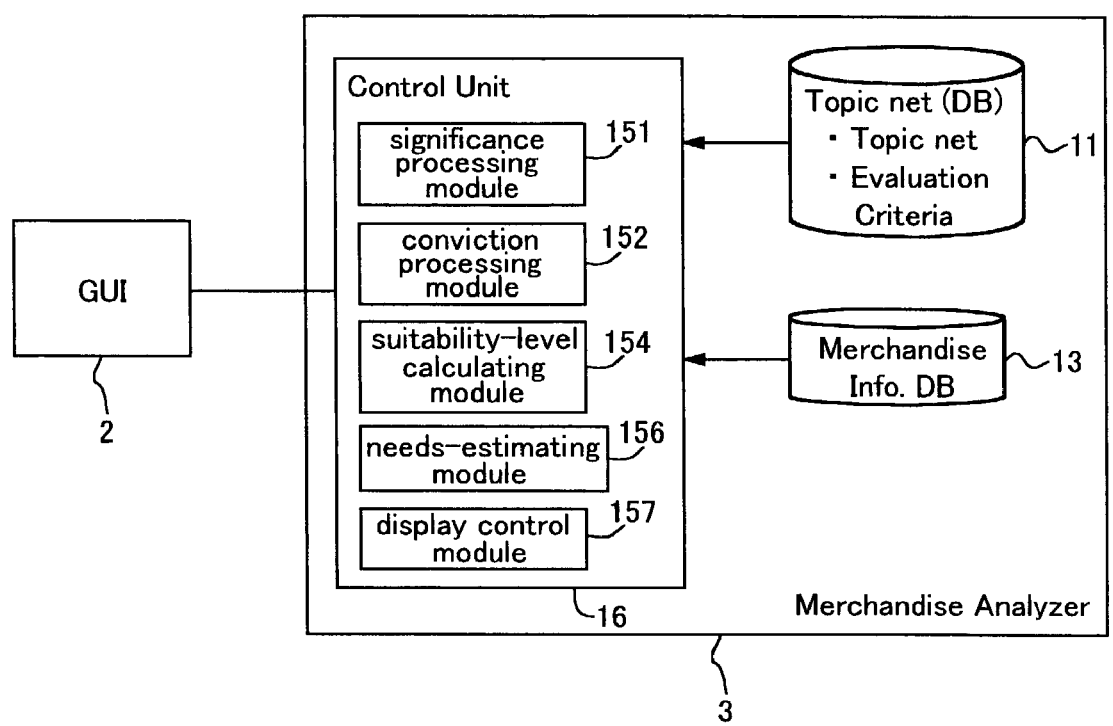
FIG. 16 is a configuration for a merchandise analyzing system having to do with a second embodiment example.

(B) FIG. 16 illustrates the configuration of a merchandise analyzing system having to do with a second embodiment example. In the figure, constituent elements having the same function as in the foregoing first embodiment example are shown labeled with reference marks identical to those of the first embodiment example. The merchandise analyzing system includes a merchandise analyzer 3 and the GUI 2. The merchandise analyzer 3 has the topic net DB 11, the merchandise information DB 13, the significance processing module 151, the conviction processing module 152, the suitability-level calculating module 154, the needs-estimating module 156, and the display control module 157.

Figure 17:
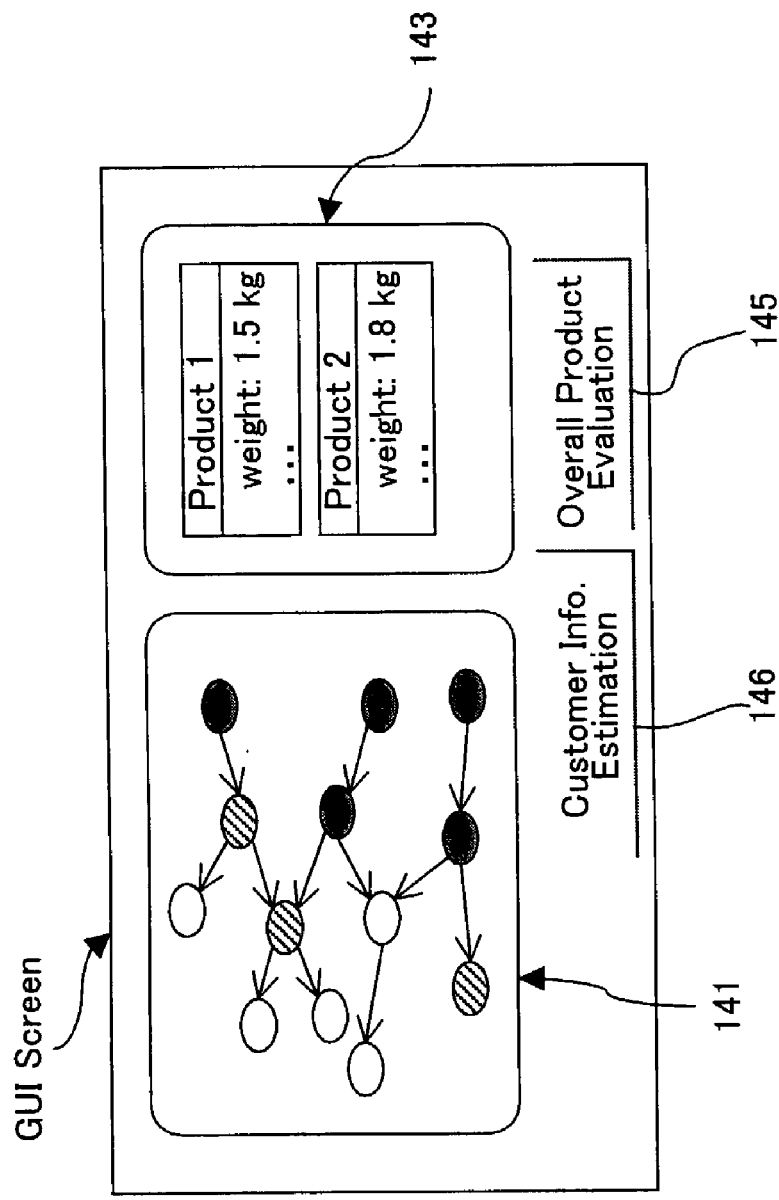
FIG. 17 is an example of a screen displayed by the GUI of FIG. 16.

The GUI 2 outputs the screen exemplified in FIG. 17. In the figure, constituent elements having the same function as in the foregoing first embodiment example are shown labeled with reference marks identical to those of the first embodiment example. The topic net window 141, the merchandise window 143, the customer-information estimation button 146, and the overall product-evaluation button 145 are displayed on the screen. The GUI 2 operator may use the GUI 2 to input virtual needs information and search for merchandise suited to the information. Further, when the operator selects any product from the merchandise window 143 in a situation in which needs information has not been configured in the topic net, a suitability level for that product and presence/absence of relevance between topic and product are displayed. Suitability level and presence/absence of relevance are calculated based on evaluation criteria on the topic net and merchandise information, likewise as in the first embodiment example.

Utilizing a merchandise analyzing system having this sort of configuration, merchandise providers may input virtual needs information to search for merchandise suited to the information. Likewise, dealers may readily learn the merits and demerits of their merchandise from the customer's point of view.

(C) The present invention comprehends recording media on which is recorded a program that executes the aforedescribed method under the present invention. Flexible disks, hard disks, semiconductor memory, CD-ROMs, DVDs, magneto-optical disks (MOs) and other computer-read/writable recording media may be given as examples in this respect.

Utilizing the present invention should enable facilitated searching for products befitting customers' needs from among a great variety of merchandise.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A needs-information architecting method comprising:
    storing a tree-structured node net including node-identifying information for specifying nodes, merchandise features for expressing features of merchandise from prespectives of users of the merchandise, correspondences between the node-identifying information and the merchandise features, link-identifying information for linked two nodes and link-indentifying information for links joining the two nodes;
    outputting the node net;
    accepting needs including accepting seletion of any of the nodes, and accepting input of needs information expressing customer needs for the merchandise features;
    calculating, based on inputted needs information for the selected nodes, needs information regarding nodes for which needs information has not been input for and are located around the selected nodes,
    wherein each merchandise feature corresponding to each node is more specific in a proceeding to nodes in one direction of a link,
    wherein the needs information contains significance levels indicating how important a customer regards each merchandise feature corresponding to a node on the node net.

2. The needs-information architecting method set forth in claim 1, wherein the needs information further contains conviction levels indicating how certain the significance levels are.

3. The needs-information archititicting method set forth in claim 2, further conveying, along the links and based on the conviction levels, the input needs information to create needs information regarding nodes for which needs information has not been input.

4. The needs-information architecting method set forth in claim 1, further comprising;
    storing support-information including storing the node-identifying information or the link-indentifying information, support information being in order to support gathering of needs information from a customer, and correspondences between the support information and the node-identifying information or the link-identifying information; and
    requesting support including accepting selection of any node or link, and accepting a demand for output of support information corresponding to the selected node or link;
    wherein said outputting further outputs the support information corresponding to the node-identifying information for the selected node or to the link-identifying for the selected link.

5. The needs-information architecting method set forth in claim 4, further comprising:
    storing display conditions that are conditions being in order to output support information suited to the customer's needs, and storing correspondences between the display conditions and the support information;
    determining based on needs information input and/or conveyed to every node, and on the display conditions, whether support information corresponding to the selected node or link is to be output, and if support information is to be output, determining the support information;
    wherein said outputting outputs the support information in accordance with the determinations in said support determining based on needs information.

6. The needs-information architecting method set forth in claim 1, further comprising:
    storing merchandise information representing information representing merchandise specifications, merchandise IDs specifying merchandise, and correspondences between the merchandise information and the merchandise IDs; and
    storing criteria including storing evaluation criteria that serve as standards for judging to what extent a product specified by an arbitrary merchandise ID matches merchandise features for a given node, and correspondences between the evaluation criteria and the node-identifying information for the node.

7. The needs-information architecting method set forth in claim 6, further comprising deternining a suitability including: the merchandise IDs, and
    calculating the first product's level of suitability for every node naving evaluation criteria, based on the evaluation criteria and the merchandise information for the first product.

8. The needs-information architecting method set forth in claim 7, further including calculating levels of relevance between each node and the first product, based on the suitability levels calulated for every node having evaluation criteria:
    wherein said outputting further outputs the relevance levels.

9. The needs-information architecting method set forth in claim 7, further comprising uniting including calculating, based on the suitability levels calculated for every node having evatuation criteria, a combined suitability level indicating to what extent the first product matches the customer needs information;
    wherein said outputting further outputs the combined suitability level.

10. The needs-information architecting method set forth in claim 9, further including determining an opotimal merchandise including determining a single product whose combined suitability level is highest("best-suited product" hereinafter) by executing said determining a suitability and said uniting with respect to all or a part of merchandise defined by the merchandise information stored in said storing merchandise information;

wherein said outputting further outputs the merchandise information for the best-suited product.

11. The needs-information architecting method set forth in claim 1, further comprising:

customer recording including storing the inputted needs information and/or the conveyed needs information, customer IDs specifying customers, and correspondences between the needs information, the node-identifying information, and the customer IDs; and customer-designating including accepting designation of a customerID;

wherein said outputting further outputs, together with the node net, needs information corresponding to the designated customer ID.

12. A computer-readable recording medium on which a needs-information architecting programing is recorded for excuting;

storing a tree-structured node net including node-identifying information for perspectives of users of the merchandise, correspondences between the node-identifying information and the merchandise features, link-indentifying informatiion for identifying links two nodes, and correspondences between node-identifying information for linked two nodes and link-identifying information for links joining the two nodes;

outputting the node net, accepting needs including accepting selection of any of the nodes, and accepting input of needs information expressing customer needs for the merchandise features; and calculating, based on inputted needs information for the selected nodes, the links to create needs information regarding nodes for which needs information has not been input for and are located around the selected nodes, wherein each nerchandise feature corresponding to each node is more specific in a proceeding to nodes in one direction of a link, wherein the needs information contains significance levels indicating how important a customer regards each merchandise feature corresponding to a node on the node net.

13. The needs-information-architecting device comprising:

a storage part that stores a tree-structured node net including node-indentifying information for specifying nodes, merchandise features for expressing features of merchandise from perspectives of users of the merchandise, correspondences between the node-identifying information and the merchandise features, link-indentifying information for identifying links joining two nodes, and correspondences between node-identifying information for linked two nodes and link-indentifying information for links joining the two nodes;

an output part that outputs the node net;

an input part that accepts selection of any of the nodes, and that accepts input of needs information expressing customer needs for the merchandise features; and a control unit that calculates, based on inputted needs information for the selected nodes, needs information regarding nodes for which needs information has notbeen input for and are located around the selected nodes, wherein each merchandise feature corresponding to each node is more specific in a proceeding to nodes in one direction of a link, wherein the needs information contains significance levels indicating how important a customer regards each merchandise feature corresponding to a node on the node net.

14. A needs-information architecting device, comprising:

means for node net storing by storing a tree-structured node net including node-identifying information for specifying nodes, merchandise features for expressing features of merchandise from perspectives of users of the merchandise, correspondences between the node-indentifying and the merchandise features, features, link-identitying information for identifying links joining two nodes, and correspondences between node-identifying information for linked two nodes and link-identifying information for links joining the two nodes;

means for outputting the node net;

means for needs acceptance by accepting selection of any of the nodes, and accepting input of needs information expressing customer needs for the merchandise features; and means for calculating, based on inputted information for the selected nodes, needs information regarding nodes for which needs information has not been input for and are located around the selected nodes wherein each merchandise feature corresponding to each node is more specitic in a proceeding to nodes in one direction of a link, wherein the needs information contains significance levels indicating how important a customer regards each merchandise feature corresponding to a node on the node net.

\* \* \* \* \*

UNITED STATES PATENT AND TRADEMARK OFFICE
CERTIFICATE OF CORRECTION

PATENT NO. : 7,555,446 B2
APPLICATION NO. : 10/284086
DATED : June 30, 2009
INVENTOR(S) : Ryosuke Miyata et al.

It is certified that error appears in the above-identified patent and that said Letters Patent is hereby corrected as shown below:

Column 15, Lines 38-39, change "prespectives" to --perspectives--.

Column 15, Line 41, after "for" insert --identifying links joining two nodes, and correspondences between node-identifying information for--.

Column 15, Line 45, change "seletion" to --selection--.

Column 15, Line 63, change "architicting" to --architecting--.

Column 16, Line 2, change "comprising;" to --comprising:--.

Column 16, Line 4, change "link-indentifying" to --link-identifying--.

Column 16, Lines 35-36, after "representing" delete "information representing".

Column 16, Lines 46-52, change
"7. The needs-information architecting method set forth in claim 6, further comprising deternining a suitability includeing: the merchandise IDs, and
    calculating the first product;s level of suitability for every
       node naving evaluation criteria, based on the evaluation
       criteria and the merchandise information for the first
       product." to
--7. The needs-information architecting method set forth in claim 6, further comprising determining a suitability including:
    regarding a first product specified with an arbitrary merchandise ID contained in the merchandise IDs, and
    calculating the first product's level of suitability for every node having evaluation criteria, based on the evaluation criteria and the merchandise information for the first product.--.

Column 16, Line 56, change "calulated" to --calculated--.

Column 16, Lines 56-57, change "criteria:" to --criteria;--.

UNITED STATES PATENT AND TRADEMARK OFFICE
CERTIFICATE OF CORRECTION

PATENT NO. : 7,555,446 B2
APPLICATION NO. : 10/284086
DATED : June 30, 2009
INVENTOR(S) : Ryosuke Miyata et al.

It is certified that error appears in the above-identified patent and that said Letters Patent is hereby corrected as shown below:

Column 16, Line 63, change "evatuation" to --evaluation--.

Column 17, Line 2, change "opotimal" to --optimal--.

Column 17, Line 4, change "highest("best" to --highest ("best--.

Column 17, Line 7, after "storing" delete "merchandise" and insert --merchandise- --.

Column 17, Line 19, change "customerID;" to --customer ID;--.

Column 17, Line 24, change "programming" to --program--.

Column 17, Line 25, change "excuting;" to --executing;--.

Column 17, Line 27, after "for" insert --specifying nodes, merchandise features for expressing features of merchandise from--.

Column 17, Lines 29-30, change "identifying informatiion" to --identifying information--.

Column 17, Line 30, after "links" insert --joining--.

Column 17, Line 34, change "net," to --net;--.

Column 17, Line 40, after "nodes," delete "the links to create".

Column 17, Line 43, change "nerchandise" to --merchandise--.

Column 17, Line 50, change "The" to --A--.

Column 17, Line 53, change "node-indentifying" to --node-identifying--.

Column 18, Line 4, change "link-indentifying" to --link-identifying--.

Column 18, Line 7, change "link-indentifying" to --link-identifying--.

UNITED STATES PATENT AND TRADEMARK OFFICE
CERTIFICATE OF CORRECTION

PATENT NO. : 7,555,446 B2
APPLICATION NO. : 10/284086
DATED : June 30, 2009
INVENTOR(S) : Ryosuke Miyata et al.

It is certified that error appears in the above-identified patent and that said Letters Patent is hereby corrected as shown below:

Column 18, Line 15, change "notbeen" to --not been--.

Column 18, Line 30, change "identifying" to --identifying information--.

Column 18, Line 30, change "features, features," to --features,--.

Column 18, Line 31, change "link-identitying" to --link-identifying--.

Column 18, Line 40, after "inputted" insert --needs--.

Column 18, Line 43, change "nodes" to --nodes,--.

Column 18, Line 45, change "specitic" to --specific--.

Signed and Sealed this

Twenty-seventh Day of October, 2009

David J. Kappos
*Director of the United States Patent and Trademark Office*